(12) United States Patent
MacLean et al.

(10) Patent No.: US 6,426,737 B1
(45) Date of Patent: Jul. 30, 2002

(54) FORMING IMAGES BY FIELD-DRIVEN RESPONSIVE LIGHT-ABSORBING PARTICLES

(75) Inventors: Steven D. MacLean, Webster; William H. Simpson, Pittsford, both of NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/215,830

(22) Filed: Dec. 18, 1998

(51) Int. Cl.$^7$ ................................................. G09G 3/34
(52) U.S. Cl. ....................... 345/107; 345/108; 345/106; 347/114; 347/115; 347/112; 347/153
(58) Field of Search ................................ 345/107, 106, 345/108, 4, 5, 6; 347/112, 114, 115, 153

(56) References Cited

U.S. PATENT DOCUMENTS

| | | | | |
|---|---|---|---|---|
| 3,612,758 A | | 10/1971 | Evans et al. | |
| 4,568,928 A | * | 2/1986 | Biferno | 340/716 |
| 4,595,259 A | * | 6/1986 | Perregaux | 350/331 |
| 5,315,312 A | * | 5/1994 | DiSanto et al. | 345/107 |
| 5,380,382 A | * | 1/1995 | Schubert | 106/493 |
| 5,573,711 A | * | 11/1996 | Hou et al. | 252/572 |
| 5,872,552 A | * | 2/1999 | Gordon, II et al. | 345/107 |
| 5,975,680 A | * | 11/1999 | Wen et al. | 345/107 |
| 6,032,014 A | * | 2/2000 | Janssens et al. | 399/270 |
| 6,144,361 A | * | 11/2000 | Gordon, II et al. | 345/107 |
| 6,177,947 B1 | * | 1/2001 | Wen et al. | 345/107 |
| 6,181,301 B1 | * | 1/2001 | Inoguchi et al. | 345/5 |

* cited by examiner

Primary Examiner—Richard Hjerpe
Assistant Examiner—Ali A. Zamani
(74) Attorney, Agent, or Firm—Raymond L. Owens (57) ABSTRACT

A transparent image producing display or receiver which uses a suspension fluid for producing pixels of an image includes at least one image-forming layer having a structure which defines a plurality of pixels, with the structure receiving a suspension fluid having field-driven particles, which move in response to an externally applied field, where, in a first condition, the field-driven particles produce a first level of transmitted incident light and, in an second condition, produce a second level of transmitted incident light.

2 Claims, 5 Drawing Sheets

FORMING IMAGES BY FIELD-DRIVEN RESPONSIVE LIGHT-ABSORBING PARTICLES

CROSS REFERENCE TO RELATED APPLICATIONS

Reference is made to commonly assigned U.S. patent application Ser. No. 09/012,842 filed Jan. 23, 1998, entitled "Addressing Non-Emissive Color Display Device" to Wen et al; U.S. patent application Ser. No. 09/035,516 filed Mar. 5, 1998, entitled "Heat Assisted Image Formation in Receivers Having Field-Driven Particles" to Wen et al; U.S. patent application Ser. No. 09/034,066 filed Mar. 3, 1998, entitled "Printing Continuous Tone Images on Receivers Having Field-Driven Particles" to Wen et al; U.S. patent application Ser. No. 09/037,229 filed Mar. 10, 1998, entitled "Calibrating Pixels in a Non-emissive Display Device" to MacLean et al; U.S. patent application Ser. No. 09/054,092 filed Apr. 2, 1998, entitled "Color Image Formation In Receivers Having Field-Driven Particles" to Wen et al; U.S. patent application Ser. No. 09/075,081 filed May 8, 1998, entitled "Color Image Device With Integral Heaters" to MacLean et al. The disclosure of these related application is incorporated herein by reference.

FIELD OF THE INVENTION

This invention relates to an image-forming device having field-driven particles.

BACKGROUND OF THE INVENTION

There are several types of field-driven particles in the field of non-emissive displays. One class uses the so-called electrophoretic particle that is based on the principle of movement of charged colloidal particles in an electric field. In an electrophoretic image-forming device, the charged particles containing different reflective optical densities can be moved by an electric field to or away from the viewing side of the device, which produces a contrast in the optical density. Another class of field-driven particles are particles carrying an electric dipole. Each pole of the particle is associated with a different optical densities (bi-chromatic). The electric dipole can be aligned by a pair of electrodes in two directions, which orient each of the two polar surfaces to the viewing direction. The different optical densities on the two halves of the particles thus produces a contrast in the optical densities.

Electrophoretic image-forming devices are limited to reflective applications. It is desired to produce a transparent electrophoretic image-forming device for transmissive applications.

Electrophoretic image-forming devices are also limited in their ability to produce high contrast and sufficient color gamut. It is desired to produce an electrophoretic image-forming device with improved contrast and color gamut.

To produce a high quality image, it is essential to form a plurality of image pixels by varying the electric field on a pixel wise basis. The electric fields can be produced by a plurality pairs of electrodes embodied in the display as disclosed in U.S. Pat. No. 3,612,758. One difficulty is in displaying color images. The field-driven particles of different colors need to be provided in discrete color pixels. This approach requires the colored particles to be placed in precise registration corresponding to the electrodes. This approach is therefore complex and expensive.

An additional problem in the displays comprising field-driven particles is forming images that are stable. Typically the images on these displays must be periodically refreshed to keep the image from degrading.

SUMMARY OF THE INVENTION

It is an object of the present invention to provide an improved way of providing field-driven electrophoretic suspensions which can readily form images in displays and receivers.

It is a further object of the present invention to provide an electrophoretic image with improved contrast and color gamut.

These objects are achieved by a display which uses a suspension fluid for producing pixels of an image, comprising:

a) at least one image-forming layer having a structure which defines a plurality of pixels, the structure including means for receiving a suspension fluid having light absorbing field-driven particles where, in a first condition, the field-driven particles present a reduced surface area to absorb a reduced portion of incident light and, in a second condition, present a wider surface area to absorb an increased portion of incident light;

b) at least one electric field forming means for selectively applying electric fields to the image-forming layer which acts upon at least one pixel and its field-driven particles in the suspension fluid; and c) electronic control means coupled to the electric field forming means so that electric fields are selectively applied at locations on the image-forming layer corresponding to pixels in response to a stored image thereby effecting changes in the position of the field-driven particles to cause the production of an image in the image-forming layer corresponding to a stored image.

These objects are also achieved by a transparent image producing receiver which uses a suspension fluid for producing pixels of an image, comprising: at least one image-forming layer having a structure which defines a plurality of pixels, with the structure including means for receiving a suspension fluid having field-driven particles, which move in response to an externally applied field, where, in a first condition, the field-driven particles produce a first level of transmitted incident light and, in an second condition, produce a second level of transmitted incident light.

Advantages

An advantage of the present invention is that a transparent electrophoretic image-forming display and receiver are provided for use in transmissive applications.

A further advantage is that a multiple layer color electrophoretic imaging displays and receivers are provided resulting in improved contrast and color gamut.

DETAILED DESCRIPTION OF THE INVENTION

Figure 1:
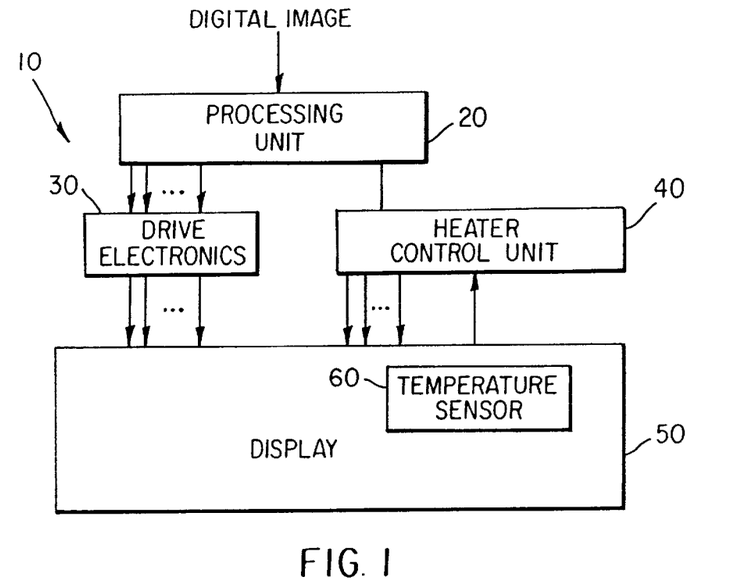
FIG. 1 shows an electronic display apparatus in accordance to the present invention.

FIG. 1 shows the electronic display apparatus 10 in accordance to the present invention. The electronic display apparatus 10 includes a processing unit 20, a drive electronics 30 which applies electric fields, a heater control unit 40, and a display 50 comprised of field-driven particles (see FIGS. 2 & 3). The display 50 includes a temperature sensor 60. A digital image is presented to the processing unit 20. The processing unit 20 controls the drive electronics 30 and the heater control unit 40. The temperature sensor 60 detects the temperature of the display and sends electrical signals corresponding to the temperature to the heater control unit 40. The heater control unit 40 regulates the temperature of the display 50. The drive electronics 30 provide the electrical signals required to write the image. Thus, the processing unit controls 20 forms the digital image on the display 50. The image-forming process will be discussed in detail below.

Figure 2:
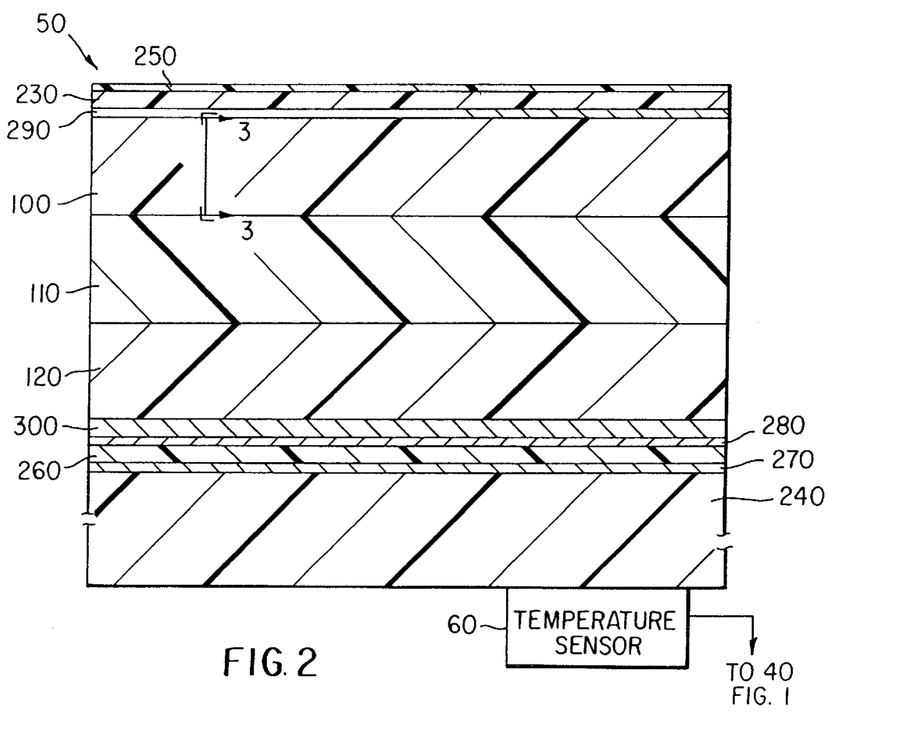
FIG. 2 shows a cross section of the display of FIG. 1.

FIG. 2 shows a cross sectional view of a portion of the display 50 of FIG. 1. The cross section shows a small portion of the display element. The display 50 is comprised of a substrate 240, a heater 270 disposed on the substrate 240, a passivation layer 260 is disposed above the heater 270, an array of bottom electrodes 280 disposed above the passivation layer 260, a reflective layer 300 disposed above the array of bottom electrodes 280, a yellow image-forming layer 120 disposed above the reflective layer 300, a magenta image-forming layer 110 disposed above the yellow image-forming layer 120, a cyan image-forming layer 100 disposed above the magenta image-forming layer 110, a top electrode 290 disposed above the magenta image-forming layer, a polymer film 230 disposed above the top electrode 290, and a protective top coat 250 disposed over the polymer film 230. The heater 270 is connected to the heater control unit 40 (not shown). The top electrode 290 is formed of transparent conducting materials such as indium tin oxide for the viewing of the image formed in the image-forming layers. The temperature sensor 60 of FIG. 1 is attached to the substrate to monitor the temperature of the display 50. The temperature sensor 60 is connected to the heater control unit 40 of FIG. 1.

Alternate electrode configurations can be used without substantially modifying the invention. One such configuration would provide a pair of transparent arrays of electrodes for each image forming layer: the yellow image-forming layer 120, the magenta image-forming layer 110, and the cyan image-forming layer 100. Each array would be individually driven by the drive electronics 30.

The substrate 240 controls the flexibility and durability of the display 50. The substrate 240 can be a polymer layer. In some applications, rigid substrate such as glass and ceramics can also be used. The heater 270 will be discussed below. The passivation layer 260 is provided to electrically isolate the bottom electrodes 280 from the heater 270. The arrays of bottom electrodes 280 is an active matrix arranged in a grid pattern. Each electrode corresponds to a pixel. The array of bottom electrodes 280 and the top electrode 290 are connected to the drive electronics 30 of FIG. 1 (not shown) to apply electric fields to the image forming layers 100, 110 & 120. An electric voltage is applied by drive electronics 30 to the pair of electrodes at each pixel location to produce the desired optical density at that pixel. A protective top coat 250 is disposed above the top electrode 290 to protect the display 50 and to provide a surface treatment (matte or gloss). Details of the addressing circuitry for the electrodes are disclosed in commonly assigned U.S. patent application Ser. No. 09/034,066 filed Mar. 3, 1998, entitled "Printing Continuous Tone Images on Receivers Having Field-Driven Particles" to Wen et al, the disclosure of which is incorporated herein.

The heater 270 is connected to the heater control unit 40 of FIG. 1. The heater 270 consists of an array of heater elements. Each heater element corresponds to a row in the display 50. The heater 270 can alternately be segmented without substantially changing the present invention. For example, an array of heaters could be formed to correspond to individual pixels, single columns, multiple columns, single rows, multiple rows, individual pixels, and other regions. The heater 270 is embodied by an array of carbon film resistors. The heaters may also be formed of a diode junction or any material which resistively consumes electrical power (creating heat). Each member of the heater 270 is electrically isolated. Since the heater 270 is adjacent to the image-forming layer(s), only a portion of the display needs to be heated to cause a change in temperature in the thermomeltable materials 210 (discussed below). Additionally, the heater is in direct contact with the display providing improved thermal conductivity. These two factors each allow the energy requirements for the display to be substantially reduced.

Three image-forming layers are shown, a cyan image-forming layer 100, a magenta image-forming layer 110, and a yellow image-forming layer 120. Each layer is similar. The cyan image-forming layer 100 is formed of cyan light absorbing particles 200 and thermomeltable material 210 with a transition temperature of Tcyan. The magenta image-forming layer 110 is formed of magenta light absorbing particles 200 and thermomeltable material 210 with a transition temperature of Tmagenta. The yellow image-forming layer 120 is formed of yellow light absorbing particles 200 and thermomeltable material 210 with a transition temperature of Tyellow. The particles 200 are each is designed to absorb a specific color of light while allowing other colors to pass with minimal absorption or scattering.

The reflective layer 300 is a polymeric film incorporating highly scattering particles, in this case toil particles. The image-forming layers 100, 110, and 120 work in conjunction with the reflective layer 300 to produce an image. Each image-forming layer is transparent. Light incident on the display panel 50 is selectively absorbed by each image-forming layer. The reflective layer 300 diffusely reflects the light through the image-forming layers for further selective absorption. The resultant image is viewed through the protective top coat 250.

Figure 3:
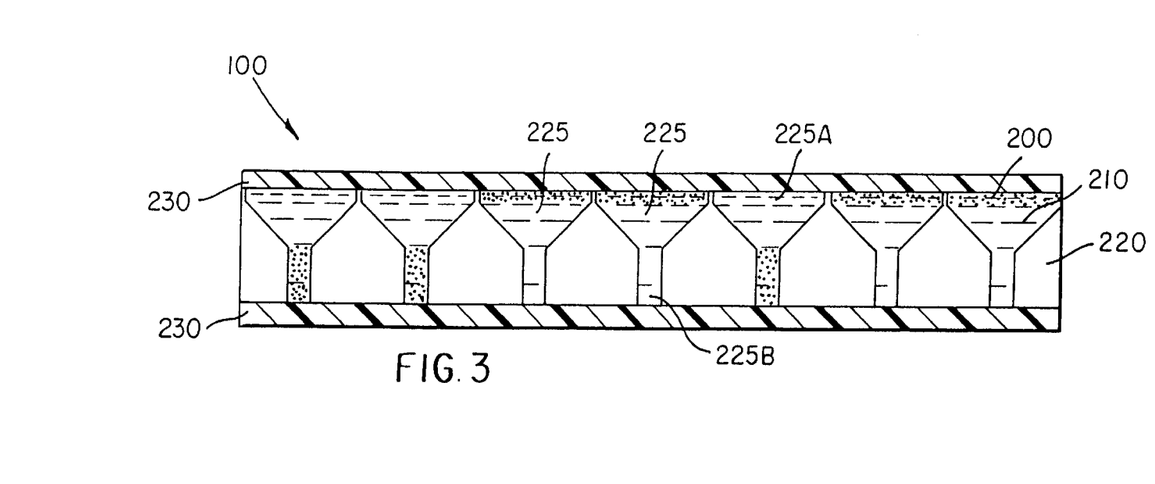
FIG. 3 shows a cross section of the cyan image-forming layer taken along line 3—3 of FIG. 2.

FIG. 3 shows a cross section of the cyan image-forming layer 100 taken along line 3—3 of FIG. 2. The cyan image-forming layer 100 is representative of the form of the magenta and yellow image-forming layers 110, 120. The cyan image-forming layer 100 includes a polymer film 230. A pixel defining structure includes a constricting screen 220 that is formed above the polymer film 230. The constricting screen 220 is filled with particles 200 suspended in a thermomeltable material 210. An additional polymer film 230 is deposited above the constricting screen 220. The polymer film 230 is transparent and serves to contain and seal the material into the constricting screen 220. The polymer film 230 may be shared by adjacent image-forming layers. The constricting screen 220 is a polymeric material. The constricting screen 220 is a layer with cavities 225 incorporated therein. The cavities 225 are constricting in nature. The cavities 225 can be described as funnel shaped, with a wider portion 225A on one end and a restricted portion 225B on the other end. The cavities 225 are arranged in a close packed manner to maximize the coverage of the cavities 225. The wider portion 225A of the cavities 225 are preferably chosen to be either rectangular or hexagonal in shape, although any shape may be chosen without substantially modifying the present invention. The constricting screen 220 can conveniently be formed by a molding process. The constricting screen 220 may be formed by a variety of known manufacturing means without changing the nature of the invention.

The particles 200 are electrophoretic particles which move in the presence of an electric field which can be applied by drive electronics such as the drive electronics 30 shown in FIG. 1. When a positive voltage the particles 200 move toward the wider portion 225A presenting a wider surface area to absorb an increased portion of the incident light; when a negative voltage is applied the particles 200 move towards the restricted portion 225B of the cavity 225 presenting a reduced surface area to absorb a reduced potion of the incident light. The particles 200 are cyan absorbing red light. In the magenta image-forming layer 110 of FIG. 2, the particle 200 are magenta absorbing green light. In the yellow image-forming layer 120 of FIG. 2 the particles 200 are yellow absorbing blue light. The thermomeltable material 210 serves as a image-forming layer selection mechanism and an electrophoretic suspension fluid. When the thermomeltable material 210 is above its transition temperature the particles 200 move in response to an electric field. When the thermomeltable material 210 is below its transition temperature the particles 210 are stabilized, fixing the formed image.

The constricting screen 220 is the functional element which together with the movement of the particles 200 forms the image. When the particles 200 are in the wider portion 225A of a cavity in constricting screen 220, the particles 200 absorb the light of their respective color, in this case cyan, incident on the cavity 225. When the particles 200 are in the restricted portion 225B of the cavity 225, the particles absorb only that portion of light incident on the restricted portion 225B of the cavity 225, the vast majority of light is passed. In this case the color response is a function of the surface coverage of the particles in the cavity 225. When the particles are in the wider portion 225A of the cavity 225 the surface coverage is high. When the particles are in the restricted portion 225B the surface coverage is low. When the particles are in the restricted portion the particles obscure each other reducing the average absorption of light.

The image-forming layers are transparent. The layers are be stacked and the images are be combined. This is especially important in forming a high quality color display. Each layer independently controls one single color channel, and a composite high quality full color image is be formed.

The term thermomeltable material will be understood to mean a material which substantially decreases its viscosity when its' temperature is raised from below to above a transition temperature (range). The transition temperature range typically corresponds to a transition in chemical phase or physical configuration. Examples of the transition include melting (and freezing), solidifying, hardening, glass transition, chemical or physical polymerization, crosslinking or gelation, aggregation or association of particles or molecules. When the temperature of the thermomeltable material is varied from above to below the transition temperature, the viscosity typically increases at least a factor of five, and preferably ten times or larger. The mobility of the field-driven particles is inversely related to the viscosity of the thermomeltable material where in the field-driven particles are immersed. The materials for the thermomeltable materials are each different having different transition temperature ranges and are discussed below.

A substantial change in the viscosity of the thermomeltable material is defined by the effects on the field-driven particles. When immersed in such thermomeltable materials, the field-driven particles are immobile at temperatures below the transition temperature: that is, the field-driven particles do not change their physical configurations in the presence of an external (e.g. electric) field or thermodynamic agitation. At temperature above the transition temperature, the field-driven particles can respond (rotation or translation) to the external field to permit the change in color reflective densities. Typically, a thermomeltable material needs to changes viscosity a factor of five or larger through the transition.

As noted above the thermomeltable materials each have different transition temperature ranges. The thermomeltable materials are chosen to have transition temperature ranges which are different and do not overlap. The transition temperature range is preferably chosen to be well above room temperature to stabilize the image at room temperature. Examples of the thermomeltable materials and their transition temperatures are listed in Table I. The thermomeltable material 210 for cyan field-driven particles 200 is selected to be carnuba wax (corypha cerifera) which has a transition temperature range of 86–90° C. The thermomeltable material 210 for magenta field-driven particles 200 is selected to be beeswax (apis mellifera) which has a transition temperature range of 62–66° C. The thermomeltable material 210 for yellow field-driven particles 200 is

TABLE 1

| Thermomeltable Material | Transition temperature range (° C.) | Comment |
| --- | --- | --- |
| Myrtle Wax | 39–43[1] | Myria Cerifera |
| Beeswax | 62–66[1] | Apis Melifera |
| Carnuba Wax | 86–90[1] | Corypha Cerifera |
| Eicosane $C_{20}H_{42}$ | 38[1] | |
| Triacontane $C_{30}H_{62}$ | 66.1[1] | |
| Pentatriacontane $C_{35}H_{72}$ | 74.7[1] | |
| Tetracosane $C_{24}H_{50}$ | 51.1[1] | |
| X-8040 Baker-Petrolite | 79[2] | Alpha olefin/maleic anhydride copolymer |
| Vybar 260 Baker-Petrolite | 54[2] | Ethylene derived hydrocarbon polymer |
| Vybar 103 Baker-Petrolite | 74[2] | Ethylene derived hydrocarbon polymer |

[1]Handbook of Chemistry and Physics, CRC Publishers, 42nd Edition, 1960–1961
[2]Technical Information, Baker-Petrolite, Tulsa, OK. 1998 selected to be myrtle wax (myria cerifera) which has a transition temperature range of 39–43° C. The thermomeltable materials are each waxes which solidify as the thermomeltable material temperature is decreased through the transition temperature range. Below the transition temperature range, the viscosity of the thermomeltable materials is substantially higher (solid) than at temperatures above the transition temperature range. Although waxes are used in the present invention other materials are equally compatible, provided they are selected to have differing transition temperature ranges. Several thermomeltable materials are shown in Table 1. It is understood that other thermomeltable materials may used in the present invention without substantially affecting the performance.

Figure 4:
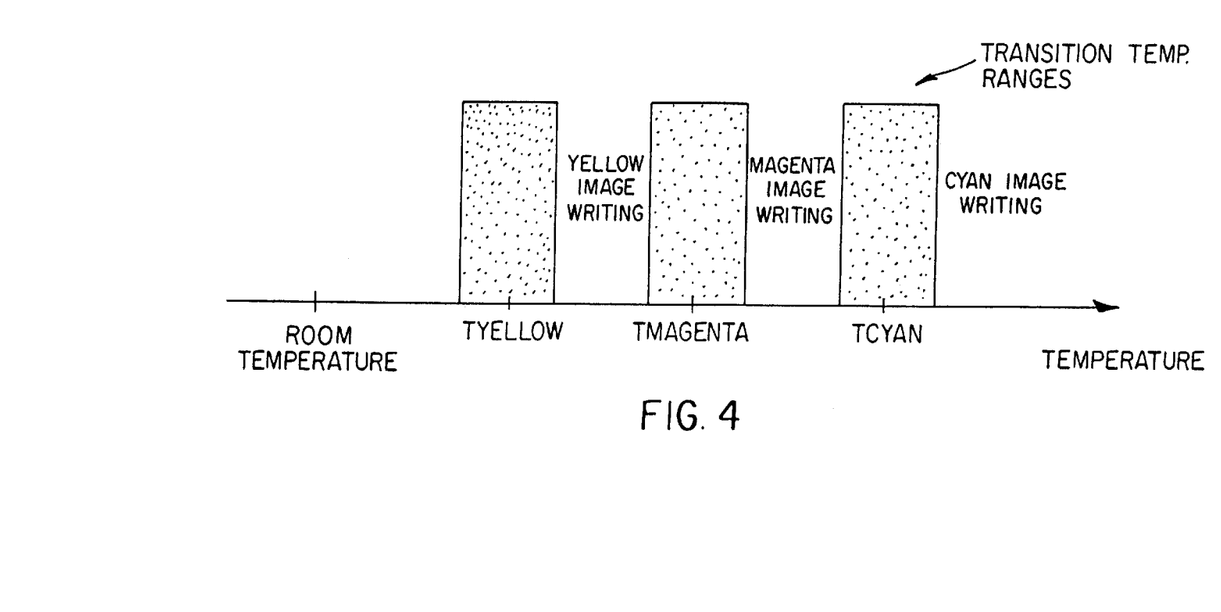
FIG. 4 is a graphical illustration of the melting temperatures of the material in microcapsules and the temperature ranges for writing different color images.

FIG. 4 shows a plot of the exemplified transition temperature ranges of the thermomeltable materials 210 of display 50 (FIG. 3). In this example the thermomeltable material 210 for cyan field-driven particles 200 have a transition temperature range Tcyan. The cyan plane is written at temperatures above this transition temperature range. The thermomeltable material 210 for magenta field-driven particles 200 have a transition temperature range Tmagenta. The magenta plane is written at temperatures above this transition temperature range and below the Tcyan transition temperature range. The thermomeltable material 210 for yellow field-driven particles 200 have a transition temperature range Tyellow. The yellow plane is written at temperatures above this transition temperature range and below the Tmagenta transition temperature range. The order of the transition temperature ranges can be changed with appropriate changes to the operating procedure.

Figure 5:
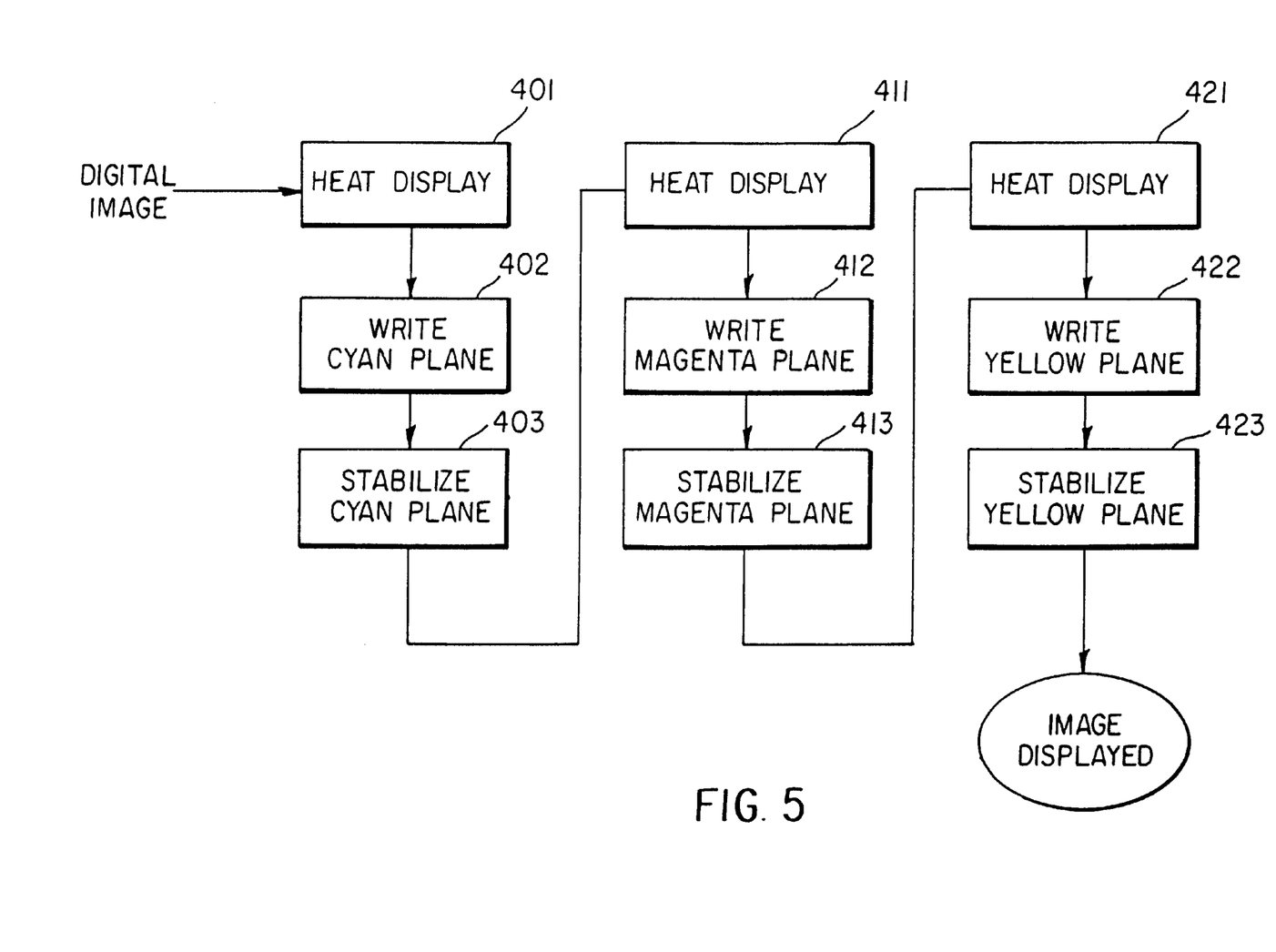
FIG. 5 schematically shows a flow diagram for producing color images on a display having color field-driven particles in accordance with the present invention.

Referring to FIG. 5, a typical operation of the electronic display apparatus 10 of FIG. 1 is described in the following. A digital image is presented to the processing unit 20 (FIG. 1). Processing unit 20 receives the digital image storing it in internal storage. All processes are controlled by processing unit 20 via drive electronics 30 (FIG. 1) and heater control unit 40 (FIG. 1). The processing unit 20, the drive electronics 30, and the heater control unit 40 will be collectively referred to as control electronics.

In a first operation heat display 401, the display 50 (FIG. 1) is heated by the heater 270 (FIG. 2) to a temperature above the transition temperature range for the thermomeltable material 210 for cyan field-driven particles 200 (FIG. 2). The amount of the heating power is controlled by heater control unit 40 (FIG. 1), using information from the temperature sensor 60 (FIG. 1). At this temperature the thermomeltable material 210 for cyan field-driven particles 200 is in a low viscosity state.

After operation heat display 401, operation write cyan plane 402 is performed. Each pixel of the cyan plane is produced by an electric field applied by the drive electronics 30. Each pixel location is driven according to the input digital image to produce the desired optical density. The voltages are applied as a waveform, the first state of the waveform a positive voltage is applied the cyan field-driven particle 200 (FIG. 3) to move to the wider portion 225A (FIG. 3) of cavity 225 (FIG. 3), erasing the cyan plane. In the second state of the waveform a negative voltage is applied for at a specific amplitude and duration, as determined by calibration data, causing a desired cyan optical density to be produced. For a more detailed description see commonly assigned U.S. patent application Ser. No. 09/034,066 filed Mar. 3, 1998, entitled "Printing Continuous Tone Images on Receivers Having Field-Driven Particles" to Wen et al, the disclosure of which is incorporated herein. The field-driven particles for the other colors have been written with the cyan plane. This side effect will be eliminated by the erasure of these colors after the stabilization of the cyan plane.

After the operation write cyan plane 402, an operation stabilize cyan plane 403 is performed. This is accomplished by cooling the display below the transition temperature range for the thermomeltable material 210 for cyan field-driven particles 200. At this temperature the thermomeltable material 210 for cyan field-driven particles 200 is in a high viscosity state and the mobility of the cyan field-driven particles 200 is reduced, stabilizing the cyan plane on the display 50.

After the operation stabilize cyan plane 403, the operation heat display 411 is performed. The display 50 (FIG. 1) is heated by the heater 270 (FIG. 2) to a temperature above the transition temperature range for the thermomeltable material 210 for magenta field-driven particles 200 (FIG. 3) and below the transition temperature range for the thermomeltable material 210 for cyan field-driven particles 200 (FIG. 3). The amount of the heating power is controlled by heater control unit 40 (FIG. 1), using information from the temperature sensor 60 (FIG. 1). At this temperature the thermomeltable material 210 for magenta field-driven particles 200 is in a low viscosity state.

After operation heat display 411, operation write magenta plane 412 is performed. Each pixel of the magenta plane is produced by an electric field applied by the drive electronics 30. Each pixel location is driven according to the input digital image to produce the desired optical density. The field-driven particles for the yellow plane has been written with the magenta plane. This side effect will be eliminated by the erasure of the yellow plane colors after the stabilization of the magenta plane.

After the operation write magenta plane 412, an operation stabilize magenta plane 413 is performed. This is accomplished by cooling the display below the transition temperature range for the thermomeltable material 210 for magenta field-driven particles 200. At this temperature the thermomeltable material 210 for magenta field-driven particles 200 is in a high viscosity state and the mobility of the magenta field-driven particles 200 is reduced, stabilizing the magenta plane on the display 50.

After the operation stabilize magenta plane 413, the operation heat display 421 is performed. The display 50 (FIG. 1) is heated by the heater 270 (FIG. 2) to a temperature above the transition temperature range for the thermomeltable material 210 for yellow field-driven particles 200 (FIG. 2) and below the transition temperature range for the thermomeltable material 210 for magenta field-driven particles 200 (FIG. 3). The amount of the heating power is controlled by heater control unit 40 (FIG. 1), using information from the temperature sensor 60 (FIG. 1). At this temperature the thermomeltable material 210 for yellow field-driven particles 200 is in a low viscosity state.

After operation heat display 421, operation write yellow plane 422 is performed. Each pixel of the yellow plane is produced by an electric field applied by the drive electronics 30. Each pixel location is driven according to the input digital image to produce the desired optical density.

After the operation write yellow plane 422, an operation stabilize yellow plane 423 is performed. This is accomplished by cooling the display below the transition temperature range for the thermomeltable material 210 for yellow field-driven particles 200. At this temperature the thermomeltable material 210 for yellow field-driven particles 200 is in a high viscosity state and the mobility of the yellow field-driven particles 200 is reduced, stabilizing the yellow plane on the display 50. This complete the formation of the image. The image is now displayed.

Briefly reviewing the operation of the control electronics. The heater control unit 40 of FIG. 1 is coupled to the heater 270 of FIG. 2 for applying heat to control the temperature of the display 50 to selectively control the response of the field-driven particles 200 when an electric field is applied and coupled to the array of bottom electrodes 280 for selectively applying voltages to the array of bottom electrodes 280 so that electric fields are applied at particular locations on the display 50 corresponding to pixels in response to the stored image whereby the array of bottom electrodes 280 produce the image in the display corresponding to the stored image.

Figure 6:
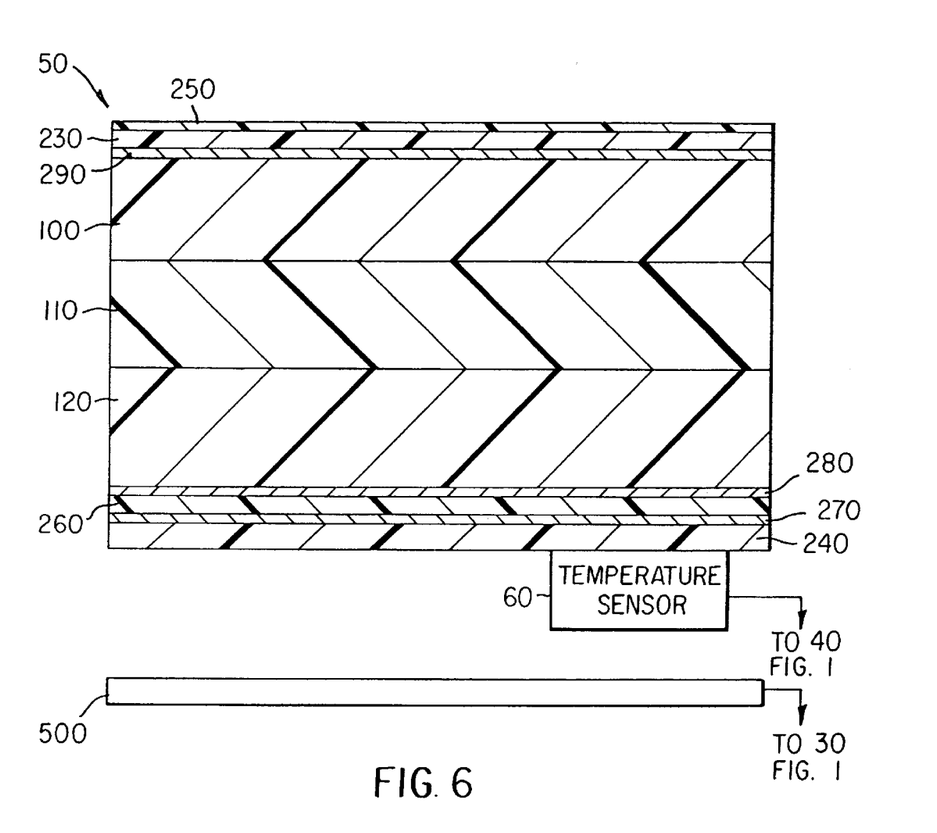
FIG. 6 shows a cross section of an alternate embodiment of the display of FIG. 1.

FIG. 6 shows a cross sectional view of a portion of an alternate embodiment of the display 50 of FIG. 1. The cross section shows a small portion of the display. The display 50 is comprised of a substrate 240, a heater 270 disposed on the substrate 240, a passivation layer 260 is disposed above the heater 270, an array of bottom electrodes 280 disposed above the passivation layer 260, a yellow image-forming layer 120 disposed above the array of bottom electrodes 280, a magenta image-forming layer 110 disposed above the yellow image-forming layer 120, a cyan image-forming layer 100 disposed above the magenta image-forming layer 110, a top electrode 290 disposed above the magenta image-forming layer, a polymer film 230 disposed above the top electrode 290, and a protective top coat 250 disposed over the polymer film 230. A back light 500 illuminates the display 50. Careful comparison will reveal that the sole difference between this embodiment and the embodiment of FIG. 2 is the removal of the reflective layer 300 and corresponding addition of the back light 500. This display is intended for back lit operation. The image-forming layer absorb light from the back light 500 to form the image which is viewed through the protective top coat 250. The back light is driven by drive electronics 30 of FIG. 1.

Figure 7:
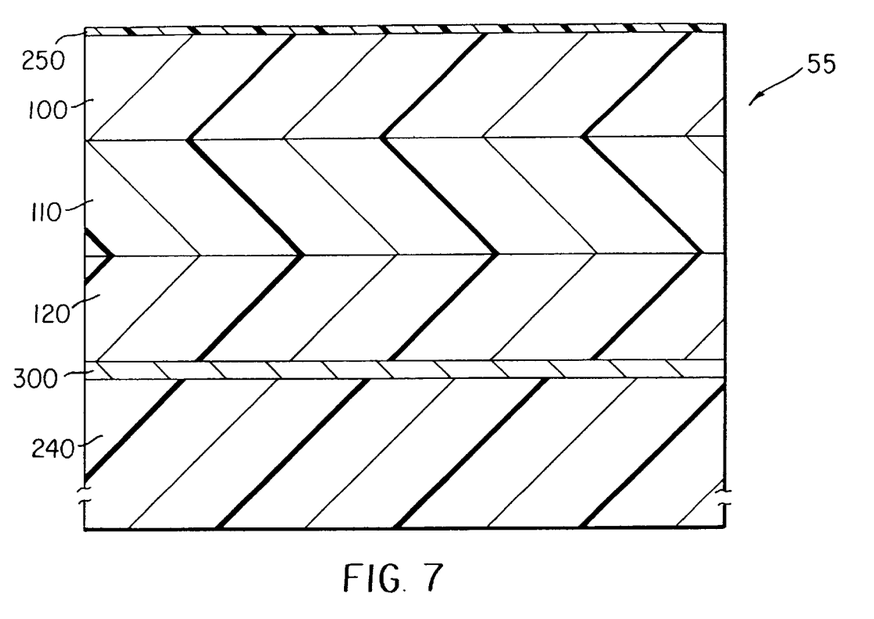
FIG. 7 shows a cross section of a image receiver in accordance to the present invention.

FIG. 7 shows a cross sectional view of a portion of a receiver according to the present invention. The cross section shows a small portion of the receiver 55. The receiver 55 is comprised of a substrate 240, a reflective layer 300 disposed on the substrate 240, a yellow image-forming layer 120 disposed above the reflective layer 300, a magenta image-forming layer 110 disposed above the yellow image-forming layer 120, a cyan image-forming layer 100 disposed above the magenta image-forming layer 110, and a protective top coat 250 disposed over the cyan image-forming layer. This receiver 55 is constructed in identical manner to the display 50 of FIG. 1 with the exception of the removal of the electronics. The receiver 55 functions in an identical manner to the mentioned display except the heat source and electric field are provided by an external image-forming apparatus. Such an apparatus is disclosed in commonly assigned U.S. patent application Ser. No. 09/034,066 filed Mar. 3, 1998, entitled "Printing Continuous Tone Images on Receivers Having Field-Driven Particles" to Wen et al, the disclosure of which is incorporated herein.

Figure 8:
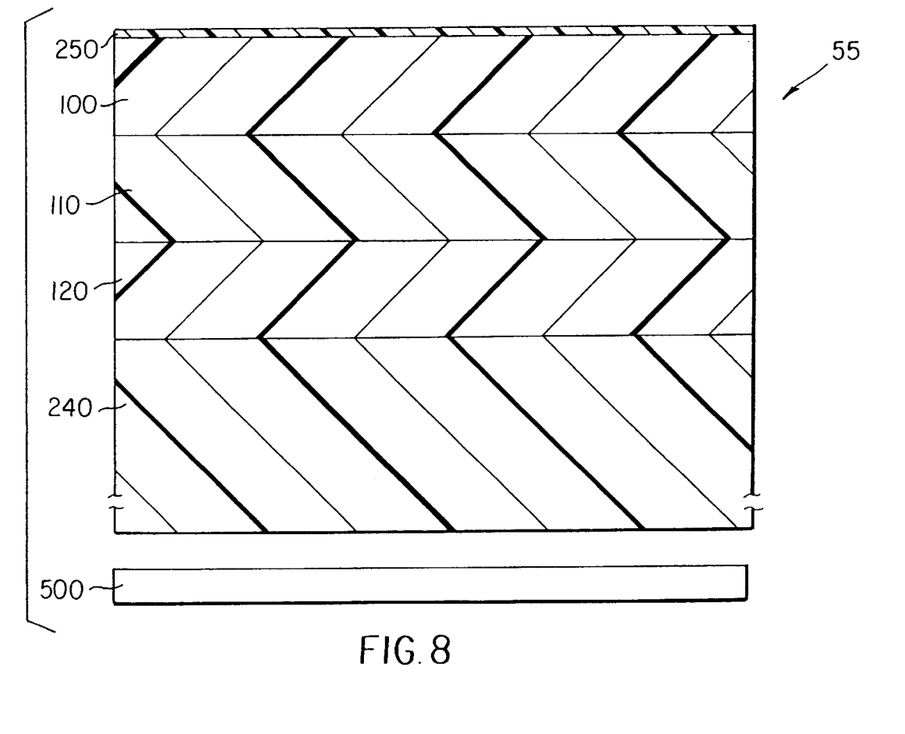
FIG. 8 shows a cross section of an alternate embodiment of the receiver of FIG. 7.

FIG. 8 shows a cross sectional view of a portion of a alternate embodiment of receiver 55 of FIG. 7. The cross section shows a small portion of the receiver 55. The receiver 55 is comprised of a substrate 240, a yellow image-forming layer 120 disposed above the substrate 240, a magenta image-forming layer 110 disposed above the yellow image-forming layer 120, a cyan image-forming layer 100 disposed above the magenta image-forming layer 110, and a protective top coat 250 disposed over the cyan image-forming layer. This receiver 55 is identical to the receiver of FIG. 7 with the exception of the removal of the reflective layer 300 of FIG. 7. This receiver is intended to be display in a projection box in front of a back light 500, shown for reference.

It is understood that the reflective layer 300 in FIG. 2 and FIG. 7 may be replaced with a trans-reflective layer to provide a display 50 and receiver 55 respectively capable of being back lighted or viewed reflectively. This change will not substantially alter the present invention.

The invention has been described in detail with particular reference to certain preferred embodiments thereof, but it will be understood that variations and modifications can be effected within the spirit and scope of the invention.

| PARTS LIST | |
|---|---|
| 10 | electronic display apparatus |
| 20 | processing unit |
| 30 | drive electronics |
| 40 | heater control unit |
| 50 | display |
| 55 | receiver |
| 60 | sensor |
| 100 | cyan image-forming layer |
| 110 | magenta image-forming layer |
| 120 | yellow image-forming layer |
| 200 | particle |
| 210 | thermomeltable material |
| 220 | constricting screen |
| 225 | cavity |
| 225A | wider portion |
| 225B | restricted portion |
| 230 | polymer film |
| 240 | substrate |
| 250 | protective top coat |
| 260 | passivation layer |
| 270 | heater |
| 280 | array of bottom electrodes |
| 290 | top electrodes |
| 300 | reflective layer |
| 401 | heat display |
| 402 | write cyan plane |
| 403 | stabilize cyan plane |
| 411 | heat display |
| 412 | write magenta plane |
| 413 | stabilize magenta plane |
| 421 | heat display |
| 422 | write yellow plane |
| 423 | stabilize yellow plane |
| 500 | back light |

What is claimed is:

1. A display comprising:
   a) a first image-forming layer including electric field-driven particles so that the electric field-driven particles move within the image-forming layer, in response to a selectively applied electric field, forming a first image;
   b) at least a second image-forming layer, deposed over the first image-forming layer, including electric field-driven particles so that the electric field-driven particles move within the image-forming layer, in response to a selectively applied electric field, forming a second image, so that the first image is viewed through the second image;
   c) at least one electric field forming means for selectively applying electric fields to the image-forming layer; and
   d) electronic control means coupled to the electric field forming means so that electric fields are selectively applied at locations on the image-forming layer corresponding to pixels in response to a stored image whereby the electrodes produces the image in the image-forming layer corresponding to the stored image.

2. An image-forming receiver comprising:
   a) a first image-forming layer including electric field-driven particles so that the electric field-driven particles move within the image-forming layer in response to a selectively applied electric field, forming a first image; and
   b) at least a second image-forming layer, deposed over the first image-forming layer, including electric field-driven particles so that the electric field-driven particles move within the image-forming layer in response to an electric field, forming a second image, so that the first image is viewed through the second image.

* * * * *